3,078,068
VALVED MECHANISM
Russell H. Romney, 3259 Bon View Drive,
Salt Lake City, Utah
Filed July 18, 1960, Ser. No. 43,406
11 Claims. (Cl. 251—149.2)

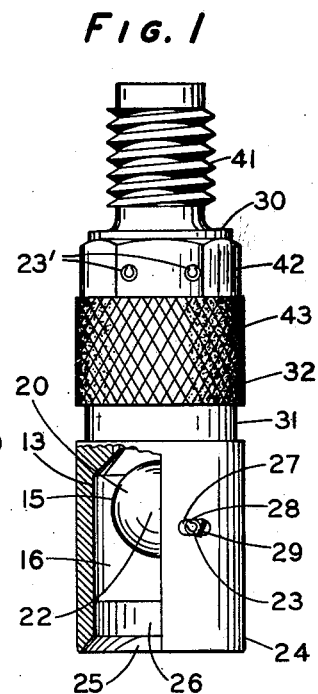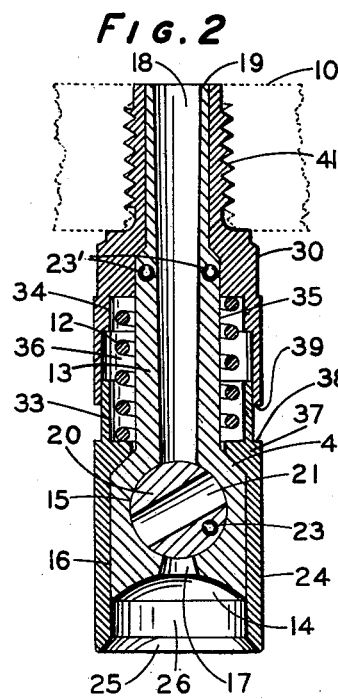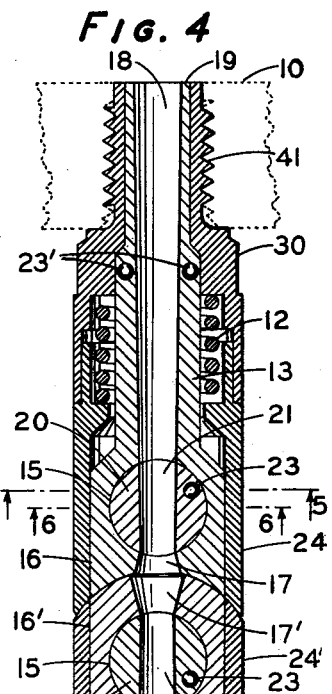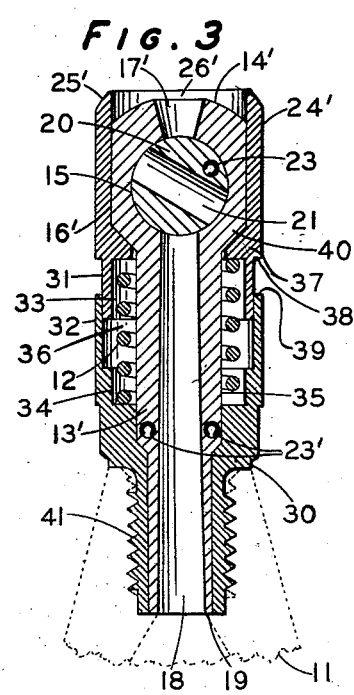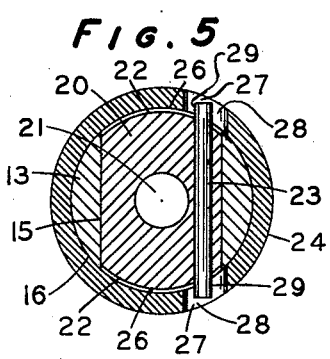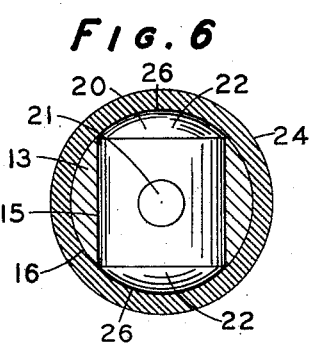
INVENTOR.
RUSSELL H. ROMNEY Feb. 19, 1963    R. H. ROMNEY    3,078,068
VALVED MECHANISM
Filed July 18, 1960    2 Sheets-Sheet 2
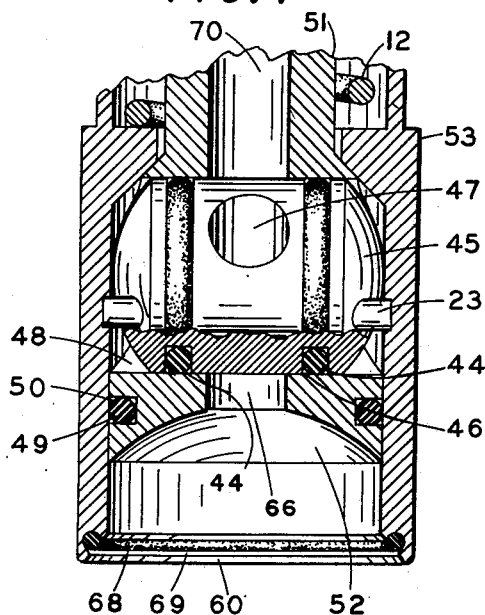
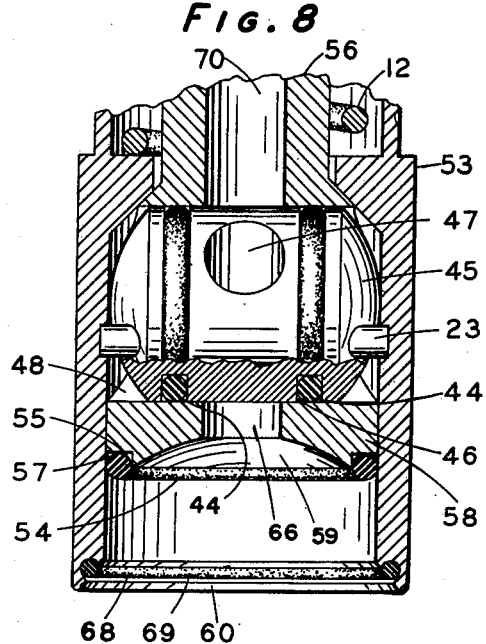
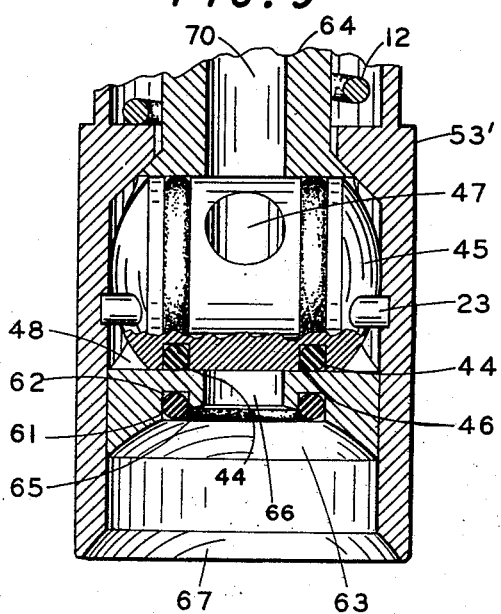
INVENTOR.
RUSSELL H. ROMNEY

United States Patent Office 3,078,068
Patented Feb. 19, 1963

This invention relates to valved mechanisms. It is primarily concerned with providing a self-closing valved mechanism for use by manufacturers of encapsulations comprising one or more of the many commercially available rigid urethane foams. However, the essential novelty of this invention admits of diverse embodiments thereof, which have utility in a variety of other applications, all of which embodiments are within the scope of the appended claims.

The invention enables a wide variety of flowable materials to be efficiently forced into or out of containing structure, but normally precludes such flow. Thus, the valve of this invention is normally-closed, but opens when the invention is in forcible contact with one of diverse cooperating means which are shaped to conform thereto. A mating nozzle is an example of the said cooperating means, as is also a similar valved mechanism of mating construction.

Although many uses for this invention require only one of a single embodiment thereof, a preferred method of application utilizes a mating male and female embodiment, respectively, each of which is attached to a separate vessel. By bringing the vessels together so that their respective valved mechanisms are forcibly in mutual conformance at their respective mating front ends, the respective valves of said mechanisms are opened, thereby constituting an intervessel passageway. When the vessels are separated the valves of their respective valved mechanisms automatically close.

A primary object of this invention is to provide a self-closing valved mechanism which is capable of efficient and repeated use in the handling of various flowable materials which solidify therein, such as the above-mentioned urethane foams and molten metals.

Another object is to provide a valve mechanism, certain parts and portions of which are capable of fabrication from materials which are capable of sustained service in the handling of diverse flowable substances which are corrosive, reactive, abrasive, or similarly otherwise troublesome.

A further object is to provide a valved mechanism which will prevent contamination of, and itself not be contaminated by, the flowable material.

A still further object is to provide a valved mechanism which offers a minimum of resistance to the flowing material.

Other objects and advantages of this invention will be readily apparent from the ensuing disclosure.

Relative to the primarily intended usage of this invention, a wide variety of urethane prepolymers are commercially available in liquid form. These are well known in the trade as "foamed-in-place" prepolymers. Certain liquid catalysts, when added in proper ratio to and mixed with these prepolymers, promote a rapid polymerization of same, generating gas and thereby creating a froth which soon cures to a rigid foam.

Electronic circuitry is often encapsulated in such foam to protect the circuitry from damage due to environmental conditions of vibration and shock. In addition, the foam provides other advantages, such as thermal insulation, moisture protection, etc.

Associated with this type of encapsulation are several problems, of which the following are examples:

(a) The polymerization process caused by mixing the catalyst with the prepolymer commences immediately and proceeds at a relatively fast rate, allowing only a few seconds for the placing of the mixture into the encapsulation mold.

(b) The newly mixed prepolymer and catalyst combination is a light, sticky froth which does not easily flow downward, by gravitational force, through the electronic circuitry being encapsulated. This gravitational method usually results in the entrapment of unwanted pockets of air. For a complete and homogeneous encapsulation, it is usually necessary that the froth be injected upward, through the bottom of the mold.

(c) The gas generated by the polymerization process inside the mixing apparatus creates an internal pressure which tends to spew froth therefrom during periods between injections.

(d) The gas generated by the polymerization process inside the mold, plus the obstruction to flow which is offered by the electronic contents of the mold, combine: thereby creating a back-pressure which tends to spew froth from the mold's one or more inlet ports.

(e) The froth adheres to metals and certain other materials, developing a cement bond with same upon curing.

All other self-closing valved mechanisms of which I am aware are impractical, if not impossible, for use in solving the above-stated problems; due, primarily, to the great difficulty of removing the foam which solidifies therein. However, this invention efficiently solves each of these problems, besides providing diverse additional advantages; all of which are augmented by the simplicity with which the solid foam is removed therefrom.

Diverse operative examples of this invention, including the best mode contemplated for carrying out same as applied to its primarily intended usage, are illustrated by the accompanying drawings, in which:

FIGURE 1 is a longitudinal elevation of a female embodiment of the invention, which is shown in its normally-closed mode; certain internal parts and features being exposed in elevation by means of a cut-away longitudinal cross-section.

FIGURE 2 is a longitudinal cross-section of the female embodiment illustrated by FIGURE 1, and includes a phantom representation of the adjacent bottom portion of the encapsulation mold which is required in the primarily intended usage of this invention.

FIGURE 3 is a longitudinal cross-section of a male embodiment of the invention, which is otherwise identical to, and cooperates with, the female embodiment illustrated by FIGURE 2. Also included is a phantom representation of the adjacent portion of the mixing apparatus which is required in the primarily intended usage of this invention.

FIGURE 4 is a longitudinal cross-section of the female and male embodiments illustrated by FIGURES 2 and 3, respectively; but which are shown in their open mode, due to cooperatively being in forcible mutual conformance at their respective mating spherical front ends. Also shown, in phantom, are the adjacent portions of the aforementioned molding and mixing apparatus, respectively.

FIGURE 5 is an enlarged, transverse cross-section, taken at the line 5—5 of FIGURE 4, showing the crankpin in elevation.

FIGURE 6 is an enlarged, transverse cross-section, taken at the line 6—6 of FIGURE 4, showing the plug in elevation.

FIGURES 7, 8 and 9, respectively, are longitudinal cross-sections of the forward portions of three somewhat different embodiments; certain parts and features of each being shown in elevation. These three respective figures principally illustrate, and mutually differ only in, the use of annular resilient sealing means to provide fluid-tight joints. It is to be noted that FIGURES 7, 8 and 9 are taken in a direction perpendicular to the plug's rotational axis, while FIGURES 1, 2, 3 and 4 are taken in the direction of said axis.

Referring to the drawings in detail, FIGURES 1 through 6 illustrate the best mode contemplated for carrying out this invention, as applied to the aforedescribed encapsulation process. For maximum efficiency, this process utilizes one or more female embodiments attached to the bottom portion of the encapsulation mold 10, and a mating male embodiment attached to the mixing apparatus 11.

An examination of the drawings reveals the fact that the illustrated embodiments are, in several respects, mutually identical. This close similarity is for the purpose of achieving simplicity and brevity herein, and is therefore not intended to imply restrictions to this invention, except as defined in the appended claims. Those parts and features which are mutually identical in form and function are therefore designated by the same reference numbers, respectively; primes being affixed to certain reference numbers to denote modifications in form or function.

During periods between injections, the female and male embodiments are separated from each other, as shown by FIGURES 2 and 3, respectively; their respective springs 12 therefore effecting the "self-closure" of each respective embodiment. Injections are facilitated when said embodiments cooperate by being forcibly held in mutual conformance at their respective mating spherical front ends, as shown by FIGURE 4. This cooperation of said embodiments results in the creation therethrough of a continuous passageway, as shown, from the mixing apparatus 11 to the encapsulation mold 10.

After sufficient time (usually two to four hours) has elapsed following injection of the froth, to effect its cure to a rigid foam, the female embodiment is detached from the mold 10 and is easily cleared of foam which has solidified therein; thereby being made capable of immediate re-use. During prolonged idle periods, the froth will, of course, also solidify inside the male embodiment which is attached to the mixing apparatus 11. However, the rigid foam is easily removed from the male embodiment, by the same method that it is removed from the female embodiment; which method is described hereinafter.

Due to the above-cited similarity of the illustrated embodiments, the following detailed explanation of the construction and mode of operation of a single embodiment applies, in most respects, to each of the other illustrated embodiments.

The female embodiment illustrated by FIGURES 1, 2, 4, 5, and 6 incorporates a stepped cylindrical body 13 whose front end 14 is spherically concave so as to conform to and cooperate with the male embodiment illustrated by FIGURE 3. A cylindrical hole 15 extends transversely through the forward cylindrical portion 16 of the body 13. The body 13 has longitudinally therein a forward passage 17 and a rearward passage 18 which are co-axial therewith and which are in the form of tapered round holes which dilate forwardly and rearwardly, respectively, from the cylindrical hole 15, and which emerge at the front and rear ends 14 and 19, respectively, of the body 13.

A cylindrical plug 20 is mounted snugly but rotatably in the cylindrical hole 15; said plug 20 having a passage 21 transversely therethrough in the form of a tapered round hole which is located centrally in the plug 20. The ends 22 of the plug 20 are cospherically convex; their respective radii of curvature originating at the center of the plug and being respectively equal in magnitude to the radius of curvature of the forward cylindrical portion 16 of the body 13.

A crankpin 23 is fixed longitudinally in the plug 20, parallel to the plug's rotational axis, and extends equidistantly from each end 22 thereof; said crankpin 23 being in the form of a self-retained fastener which is sold under the trademark "Rollpin."

A Rollpin consists of sheet material which has been rolled or otherwise formed into a single-wall, unseamed, cylinder, having a spring quality by which it is self-retained in a slightly undersized mounting hole.

A cylindrical sleeve 24 is co-axially mounted snugly but slidably on the forward cylindrical portion 16 of the body 13. The front end 25 of the sleeve 24 is spherically concave so as to conform to and cooperate with the male embodiment illustrated by FIGURE 3. The spherical front ends 25 and 14 of the sleeve 24 and body 13, respectively, are mutually cospherical when the sleeve 24 is displaced to the limit of its rearward travel, as shown by FIGURE 4. The plug is prevented from being displaced in the direction of its rotational axis, due to the fact that its cospherical ends 22 are contiguous with the inner cylindrical surface 26 of the sleeve 24. A slot 27, having mutually parallel sides 28, extends transversely through the sleeve 24, so that its parallel sides 28 are perpendicular to the direction of the sleeve's longitudinal axis. The slot 27 is located somewhat off-center, (laterally, with respect to the sleeve's longitudinal axis) and engages the cylindrical ends 29 of the crankpin 23 snugly but slidably and rotatably between its parallel sides 28, so that longitudinal sliding of the sleeve 24 on the forward cylindrical portion 16 of the body 13 causes rotation of the plug 20 which is mounted therein.

A cylindrical bonnet 30 is co-axially mounted rearwardly on the body 13 and is firmly attached thereto by means of a pair of the aforedescribed Rollpin 23', which are individually identical to the crankpin 23. The said Rollpins 23' extend transversely through the body 13 and the bonnet 30; the rearward passage 18 being located therebetween.

The rearward portion 31 of the sleeve 24 and the forward portion 32 of the bonnet 30 have cylindrical interiors 33 and 34, respectively, which are individually of relatively larger diameter than the cylindrical exterior 35 of that portion of the body 13 which extends therethrough; the said rearward portion 31 of the sleeve 24 being telescoped in the said forward portion 32 of the bonnet 30, so that an annular chamber 36 is thereby formed about said cylindrical exterior 35 of the body 13.

A helical compression spring 12 is disposed in the annular chamber 36; said spring 12 always applying a forward thrust to the sleeve 24, via an internal collar 37 of the sleeve 24. The various parts are formed and oriented so that the embodiment is fully open when the sleeve 24 is displaced (by forcible conformance with the mating sleeve 24' of the male embodiment) to the limit of its rearward travel against the action of the spring 12; the passage 21 through the plug 20 then being in full communication with the passages 17 and 18 in the body 13; the embodiment therefore having an uninterrupted passageway longitudinally and co-axially therethrough.

Note that when the embodiment is thusly in its open mode, the tapered round passage 21 of the plug 20 forms a relatively smooth continuation of the tapered round rearward passage 18 of the body 13; the utility of which is explained hereinafter.

When the male and female embodiments are separated, the spring 12 advances the sleeve 24 to the limit of its forward travel; thereby rotating the plug 20 so that its passage 21 does not communicate with the passages 17 and 18 in the body 13; the embodiment therefore being fully closed.

The rearward travel of the sleeve 24 is limited by mutual contact of an external shoulder 38 of the sleeve 24 and the front end 39 of the bonnet 30. The forward travel of the sleeve 24 is limited by mutual contact of the internal collar 37 of the sleeve 24 and an external shoulder 40 of the body 13.

The bonnet 30 incorporates external threads 41 rearwardly thereon, by means of which the valve is fastened to its associated encapsulation mold 10. The tasks of attaching and detaching the valve from its associated encapsulation mold 10 are facilitated by a hexagonal portion 42 and a knurled portion 43 which are incorporated forwardly on the bonnet 30.

The method by which the solidified foam is removed from the individual male and female embodiments which are illustrated by FIGURES 1 through 6 will now be explained. In actual tests of this embodiment, the act of commencing to unscrew the embodiment from its associated apparatus 10 or 11 has proved to be a most effective method for loosening the rigid foam from the rearward passage 18. In the usual case, when the embodiment is unscrewed from its associated apparatus 10 or 11, the foam which had solidified inside the rearward passage 18 remains intact and connected to the body of rigid foam inside the associated equipment 10 or 11. Since the forward passage 17 or 17' is relatively short, the foam which had solidified therein is easily plucked or pulled therefrom.

With the forward passage 17 or 17' and the rearward passage 18 thusly cleared of the foam which had solidified therein, the only task remaining to make the embodiment ready for immediate re-use is to remove the foam which had solidified inside the plug's transverse passage 21. This is easily accomplished by displacing the sleeve 24 or 24' to the limit of its rearward travel and by holding it in that position while a simple rod (not shown) is inserted into the forward passage 17 or 17' and thence rearwardly on through the embodiment.

It was hereinbefore noted that the body's rearward passage 18 and the plug's transverse passage 21 cooperatively form a continuously tapered passageway when the embodiment is in its open mode; the utility of which will now be explained. In rather unusual cases, when the embodiment is being unscrewed from its associated apparatus 10 or 11, the solidified foam inside the rearward passage 18 is inadvertently severed from the body of foam inside the associated apparatus 10 or 11. In such cases, the solidified foam inside the forward passage 17 or 17' is easily plucked or pulled therefrom, in the same manner as described above. However, the solidified foam inside the rearward passage 18 is comparatively much more difficult to be pulled therefrom, due, of course, to the relatively greater length of the rearward passage 18 compared with the relatively lesser length of the forward passage 17 or 17'. The illustrated configuration of tapered passages eliminates the need for pulling the solidified foam from the rearward passage 18 by providing for it to be easily pushed therefrom by the solidified foam inside the plug's passage 21, which in turn is pushed therefrom by a simple rod, as explained above.

It is here noted that spherical front ends of cooperating embodiments have considerable utility in that they mutually guide each other into accurate contact, thereby eliminating troublesome spillage of the flowable material being handled. An additional advantage readily seen to be inherent in a spherical junction between cooperating embodiments is that there is no need for strict axial alignment therebetween.

As hereinbefore stated, this invention admits of a wide variety of embodiments thereof; some of which handle fluids which are relatively much less viscous than the aforedescribed froth and which are sometimes under considerable pressure. In such cases, it is often necessary that this invention incorporate sealing means to provide substantially leakproof operation, as illustrated by FIGURES 7, 8, and 9, respectively. The fact should be kept in mind that the particular embodiments shown are merely examples of the many similar embodiments, and are therefore not intended to be restrictive as to either the sealing means or the manner of their application, except as defined by the appended claims.

The annular resilient sealing means 44 of the plug 45 and the manner of their application are mutually identical for FIGURES 7, 8, and 9. Two identical recessed grooves 46 encircle the plug 45, so that the transverse passage 47 is located therebetween. Each of these two grooves 46 receives a gasket ring 44 which essentially forms a rotating seal between the plug 45 and the hole 48 in which the plug 45 is mounted; each of these seals being substantially fluid-tight.

The embodiment illustrated by FIGURE 7 incorporates a gasket ring 49 received by a recessed groove 50 which encircles the body 51 at a location between its transverse cylindrical hole 48 and its spherically concave front end 52. The gasket ring 49 essentially forms a sliding seal between the body 51 and the sleeve 53, which seal is substantially fluid-tight.

The embodiment illustrated by FIGURE 8 incorporates a gasket ring 54 received by a recessed groove 55 which encircles the body 56 at the juncture 57 of its forward cylindrical portion 58 and its spherically concave front end 59. The gasket ring 54 essentially forms a sliding seal between the body 56 and the sleeve 53 and diverse cooperating means (not shown) which are shaped spherically convex to conform to the spherical concavities 59 and 60 of the embodiment; said seal being substantially fluid-tight.

The embodiment illustrated by FIGURE 9 incorporates a gasket ring 61 received by a groove 62 recessed in the spherically concave front end 63 of the body 64; the groove 62 co-axially encircling the front port 65 of the body's forward passage 66. The gasket ring 61 essentially forms a sliding seal between the body 64 and diverse cooperating means (not shown) which are shaped spherically concex to conform to the spherical concavities 63 and 67 of the embodiment; said seal being substantially fluid-tight.

The respective embodiments illustrated by FIGURES 7 and 8 individually incorporate a gasket ring 68 received by a groove 69 recessed in the spherically concave front end 60 of the sleeve 53; the groove 69 being co-axial with the sleeve's longitudinal axis. The gasket ring 68 essentially forms a sliding seal between the sleeve 53 and diverse cooperating means (not shown) which are shaped spherically convex to conform to the spherical concavities 52, 59, and 69 of the embodiments, respectively; said seal being substantially fluid-tight. Regarding these sealing means 68 and the grooves 69 in which they are received, attention is here called to the fact that they are sometimes advantageously omitted when equivalent sealing means are carried by cooperating means (not shown) which conform thereto.

The exemplary embodiments illustrated by FIGURES 7, 8, and 9 are mutually identical, except for their individual differences in their incorporation of diverse sealing means to provide fluid-tight joints. Since there is usually no advantage to be gained by the passages having tapered contours when handling fluids which do not solidify therein, FIGURES 7, 8, and 9, respectively, incorporate nontapered passages 47, 66, and 70. Except for the hereinabove cited incorporation of sealing means and nontapered passages, the embodiments illustrated by FIGURES 7, 8, and 9, respectively, are identical in construction and mode of operation to the hereinbefore described female embodiment illustrated by FIGURES 1, 2, 4, 5, and 6, respectively.

The particular sealing means incorporated by the illustrated embodiments and described hereinbefore are indeed "circular", in all respects. However, the term "annular", as used in the appended claims, carries the additional connotation of "endlessness", in the same sense that a "ring" is endless, and is therefore not restricted to descriptions of formations which are exactly "circular".

This invention is unrestricted as to materials of fabrication. However, the capability of a given embodiment thereof to satisfy the needs of its particular application is, of course, greatly augmented by the proper choice of materials from which it is fabricated.

This invention, as embodied for its primarily intended usage, utilizes two thermoplastic materials for the fabrication of certain parts; i.e., the body 13 and 13' and the plug 20 are individually fabricated from a tetrafluoroethylene resin which is sold under the trademark "Teflon", the sleeve 24 and 24' and the bonnet 30 being fabricated from a superpolyoxymethylene acetal resin which is sold under the trademark "Delrin". In this usage, the primary advantage of Teflon is its inherent characteristic by which it prevents the foam from adhering thereto. Teflon also provides other advantages for these embodiments, such as self-lubricity and a high degree of chemical inertness. Delrin provides similar advantages in this usage to those of Teflon, but to a lesser extent; the principal advantages of Delrin being its mechanical properties, such as its relatively high strength and its dimensional stability, plus its relatively low cost. It is here noted that Teflon and Delrin provide considerable utility in diverse other embodiments of this invention.

As applied to the handling of molten metals and other highly corrosive or reactive substances, this invention is advantageously embodied in part or all by a wide variety of ceramic materials, examples of which are well known in the ceramic art under the generic classifications of aluminas, berylias, cermets, glasses, magnesias, porcelains, silicates, zirconias, etc.; the particular requirements of each application dictating the specific ceramic materials to be used.

Certain embodiments (not shown) of this invention provide overtravel for the sleeve when the valve is in its fully open mode; i.e., the sleeve may be rearwardly displaced beyond the amount required to cause the valve to be fully open. The principal advantage of this over-travel feature is that it provides for more positive sealing between the front end of the body and the mating cooperating means.

In certain other embodiments (not shown), the front end of the body is prevented from contacting the cooperating means when the valve is in its fully open mode; the sleeve then being displaced to the limit of its rearward travel. A principal advantage of embodiments of this type is that they provide for more positive sealing between the front end of the sleeve and the mating cooperating means.

It is here noted that "conform", as used in the appended claims, carries the broad connotation of "being so as to act in harmony with" and therefore includes, but is not restricted to, descriptions involving actual "contact" between the particular items being described.

Due to the fact that the spirit and scope of this invention admits of a great variety of apparently widely different embodiments thereof, it is to be understood that this invention is not restricted to specific embodiments thereof, except as defined in the appended claims.

What I claim is:

1. A valved mechanism of the character described, comprising, in combination, a body having a cylindrical hole which extends transversely therethrough, said body having therein a plurality of passages which emanate from said cylindrical hole and which emerge from said body so as to communicate with cooperating means; a cylindrical plug mounted snugly but rotatably in said cylindrical hole, said plug having at least one passage which extends therethrough and which is positioned therein so as to cooperate with said passages in said body; a sleeve mounted snugly but slidably on said body and extending over said hole in which said plug is mounted, said plug and said sleeve being mutually adapted to prevent displacement of said plug in the direction of the plug's rotational axis; crank means associated with said plug and said sleeve so that longitudinal sliding of said sleeve on said body causes rotation of said plug in said body, said rotation causing said plug to act as a valve intermediate said passages in said body.

2. A valved mechanism in accordance with claim 1 and incorporating sealing means enabling said mechanism to operate in a substantially leakproof manner.

3. A valved mechanism of the character described, comprising, in combination, a body whose front end is adapted to co-act with cooperating means, said body having a cylindrical hole which extends transversely therethrough, said body having longitudinally therein a forward passage and a rearward passage which emanate forwardly and rearwardly, respectively, from said cylindrical hole and which emerge at the front and rear ends, respectively, of said body; a cylindrical plug mounted snugly but rotatably in said cylindrical hole, said plug having a passage which extends transversely therethrough and which is positioned therein so as to cooperate with said passages in said body; a sleeve mounted snugly but slidably on said body and extending over said hole in which said plug is mounted, said plug and said sleeve being mutually adapted to prevent displacement of said plug in the direction of the plug's rotational axis, the front end of said sleeve being adapted to co-act with cooperating means, said sleeve and said body being mutually adapted to provide a forward limit and a rearward limit to the sliding of said sleeve on said body, resilient means associated with said sleeve for applying forward thrust thereto; crank means associated with said plug and said sleeve so that longitudinal sliding of said sleeve on said body causes rotation of said plug in said body, said rotation causing said plug to act as a valve intermediate said passages in said body, said valve being fully open when said sleeve is displaced to its rearward limit against the action of said resilient means and being fully closed when said resilient means advances said sleeve to its forward limit.

4. A valved mechanism in accordance with claim 3 and incorporating a plurality of diverse, annular, resilient sealing means to provide fluid-tight joints; at least two of said sealing means encircling said plug when said plug is mounted in said body so that the ports in said plug are intermediate said sealing means, said sealing means being contiguous with the cylindrical external surface of said plug and the cylindrical surface of said hole in which said plug is mounted; at least one other of said sealing means encircling said body when said sleeve is mounted on said body so that said sealing means is intermediate said cylindrical hole in which said plug is mounted and the front end of said body, said sealing means being contiguous with the lateral external surface of said body and the internal surface of said sleeve.

5. A valved mechanism in accordance with claim 3 and incorporating a plurality of diverse, annular, resilient sealing means to provide fluid-tight joints; at least two of said sealing means encircling said plug when said plug is mounted in said body so that the ports in said plug are intermediate said sealing means, said sealing means being contiguous with the cylindrical external surface of said plug and the cylindrical surface of said hole in which said plug is mounted; at least one other of said sealing means encircling said body when said sleeve is mounted on said body so that said sealing means is intermediate said cylindrical hole in which said plug is mounted and the front end of said body, said sealing means being contiguous with the lateral external surface of said body and the internal surface of said sleeve; the front end of said sleeve being provided circumjacently with at least still one other of said sealing means, said sealing means being contiguous with said front end of said sleeve and with that portion of said sleeve's cooperating means which co-acts therewith.

6. A valved mechanism in accordance with claim 3 and incorporating a plurality of diverse, annular, resilient sealing means to provide fluid-tight joints; at least two of said sealing means encircling said plug when said plug is mounted in said body so that the ports in said plug are intermediate said sealing means, said sealing means being contiguous with the cylindrical external surface of said plug and the cylindrical surface of said hole in which said plug is mounted; at least one other of said sealing means attached to and encircling said body at the juncture of the frontmost lateral external surface and the front end surface of said body, said sealing means being contiguous with said frontmost lateral external surface of said body and with the internal surface of said sleeve and with those portions of cooperating means which co-act therewith.

7. A valved mechanism in accordance with claim 3 and incorporating a plurality of diverse, annular, resilient sealing means to provide fluid-tight joints; at least two of said sealing means encircling said plug when said plug is mounted in said body so that the ports in said plug are intermediate said sealing means, said sealing means being contiguous with the cylindrical external surface of said plug and the cylindrical surface of said hole in which said plug is mounted; at least one other of said sealing means attached to and encircling said body at the juncture of the frontmost lateral external surface and the front end surface of said body, said sealing means being contiguous with said frontmost lateral external surface of said body and wtih the internal surface of said sleeve and with those portions of cooperating means which co-act therewith; the front end of said sleeve being provided circumjacently with at least still one other of said sealing means, said sealing means being contiguous with said front end of said sleeve and with those portions of cooperating means which co-act therewith.

8. A valved mechanism in accordance with claim 3 and incorporating a plurality of diverse, annular, resilient sealing means to provide fluid-tight joints; at least two of said sealing means encircling said plug when said plug is mounted in said body so that the ports in said plug are intermediate said sealing means, said sealing means being contiguous with the cylindrical external surface of said plug and the cylindrical surface of said hole in which said plug is mounted; the front end of said body being provided with at least one other of said sealing means, said sealing means being contiguous with said front end of said body and with those portions of cooperating means which co-act therewith.

9. A valved mechanism in accordance with claim 3 in which said forward and rearward passages in said body are tapered round holes which dilate forwardly and rearwardly, respectively, from said hole in which said plug is mounted.

10. A valved mechanism of the character described, comprising, in combination, a body whose front end is spherical so as to conform to spherical cooperating means, the forward portion of said body being cylindrical and having a cylindrical hole which extends transversely therethrough, said body having longitudinally therein a forward passage and a rearward passage which emanate forwardly and rearwardly, respectively, from said cylindrical hole and which emerge at the front and rear ends, respectively, of said body; a cylindrical plug mounted snugly but rotatably in said cylindrical hole, said plug having a passage which extends transversely therethrough and which is positioned therein so as to cooperate with said passages in said body, each end of said plug having at least a portion thereof shaped spherically convex, said convex end portions of said plug being mutually cospherical and having a radius of curvature which is nominally equal to the radius of curvature of said forward cylindrical portion of said body; a sleeve mounted snugly but slidably on said forward cylindrical portion of said body and extending over said hole in which said plug is mounted, said convex end portions of said plug being contiguous with the sleeve's internal surface so as to prevent displacement of said plug in the direction of the plug's rotational axis, the front end of said sleeve being spherical so as to conform to spherical cooperating means, said sleeve and said body being mutually adapted to provide a forward limit and a rearward limit to the sliding of said sleeve on said forward cylindrical portion of said body, said sleeve having a slot transversely therethrough, said slot having mutually parallel sides which are perpendicular to the direction of the sleeve's longitudinal axis, resilient means associated with said sleeve for applying forward thrust thereto; a pair of cylindrical projections carried eccentrically by the ends of said plug, the symmetrical axes of said projections being mutually aligned and parallel to the plug's rotational axis, said projections being snugly but rotatably and slidably engaged by said slot through said sleeve so that longitudinal sliding of said sleeve on said forward cylindrical portion of said body causes rotation of said plug in said body, said rotation causing said plug to act as a valve intermediate said passages in said body, said valve being fully open when said sleeve is displaced to its rearward limit against the action of said resilient means and being fully closed when said resilient means advances said sleeve to its forward limit.

11. A valved mechanism of the character described, comprising, in combination, a cylindrical body whose front end is spherical so as to conform to spherical cooperating means, the forward portion of said body having a cylindrical hole which extends transversely therethrough, said body having longitudinally therein a forward passage and a rearward passage which emanate forwardly and rearwardly, respectively, from said cylindrical hole and which emerge at the front and rear ends, respectively, of said body; a cylindrical plug mounted snugly but rotatably in said cylindrical hole, said plug having a passage which extends transversely therethrough and which is positioned therein so as to cooperate with said passages in said body, the ends of said plug being cospherically convex and having a radius of curvature which is nominally equal to the radius of curvature of said forward portion of said body; a sleeve mounted snugly but slidably on said forward portion of said body and extending over said hole in which said plug is mounted, said convex ends of said plug being contiguous with the sleeve's internal surface so as to prevent displacement of said plug in the direction of the plug's rotational axis, the front end of said sleeve being spherical so as to conform to spherical cooperating means, said sleeve and said body being mutually adapted to provide a forward limit to the sliding of said sleeve on said forward portion of said body, said sleeve having a slot transversely therethrough, said slot having mutually parallel sides which are perpendicular to the direction of the sleeve's longitudinal axis; a bonnet mounted rearwardly on said body and firmly attached thereto, the forward portion of said bonnet and the rearward portion of said sleeve cooperatively forming an annular chamber about said body, said sleeve and said bonnet being mutually adapted to provide a rearward limit to the sliding of said sleeve on said forward portion of said body, said bonnet being adapted so as to be attachable to and detachable from other cooperating means; resilient means disposed in said annular chamber for applying forward thrust to said sleeve, said thrust normally holding said sleeve at the sleeve's forward limit, said spherical front end of said sleeve being cospherical with said spherical front end of said body when said sleeve is displaced to its rearward limit against the action of said resilient means; a cylindrical crankpin carried eccentrically by said plug, the symmetrical axis of said crankpin being parallel to the plug's rotational axis, the ends of said crankpin projecting from the ends of said plug and being snugly but rotatably and slidably engaged by said slot through said sleeve so that longitudinal sliding of said sleeve on said forward portion of said body causes rotation of said plug in said body, said rotation causing said plug to act as a vaive intermediate said passages in said body, said valve being fully open when said sleeve is displaced to its rearward limit against the action of said resilient means and being fully closed when said resilient means advances said sleeve to its forward limit.

(References on following page)

References Cited in the file of this patent

UNITED STATES PATENTS

| | | |
|---|---|---|
| 187,982 | Pirsson et al. | Mar. 6, 1877 |
| 1,646,708 | Richmond | Oct. 25, 1927 |
| 2,872,216 | Kaiser | Feb. 3, 1953 |
| 2,948,553 | Gill et al. | Aug. 9, 1960 |
| 2,991,090 | De Cenzo | July 4, 1961 |

FOREIGN PATENTS

| | | |
|---|---|---|
| 874,879 | France | May 26, 1942 |
| 1,029,343 | France | Mar. 4, 1953 |